Aug. 10, 1937.  G. C. R. KUIPER  2,089,491
POWER CYLINDER
Filed Oct. 28, 1933  2 Sheets-Sheet 2
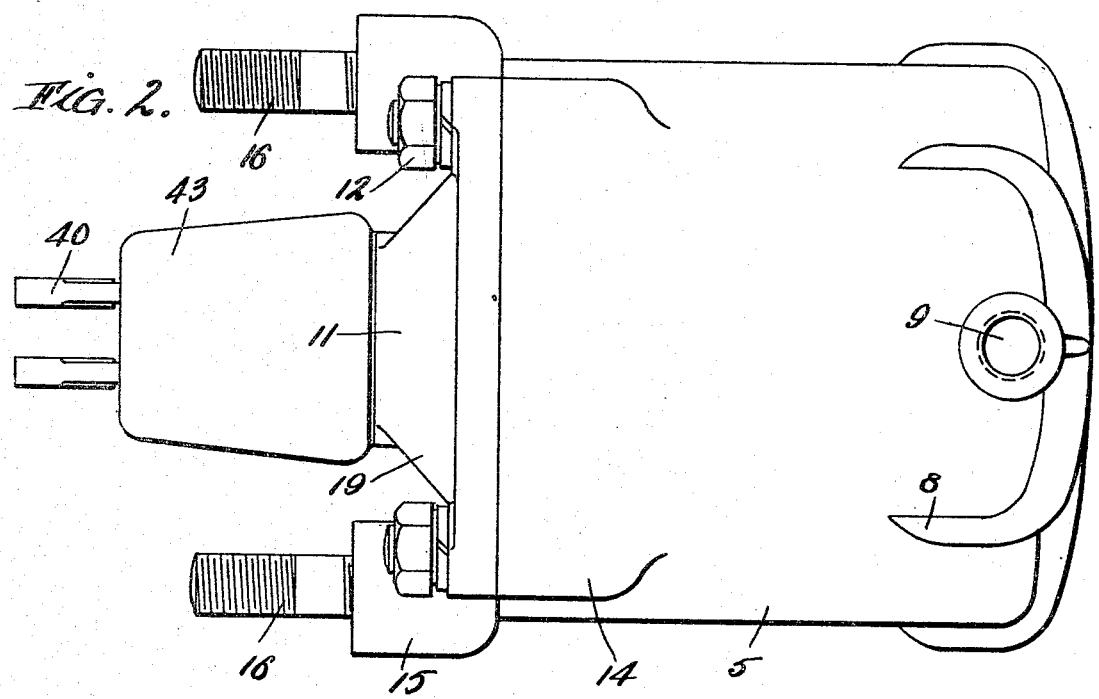
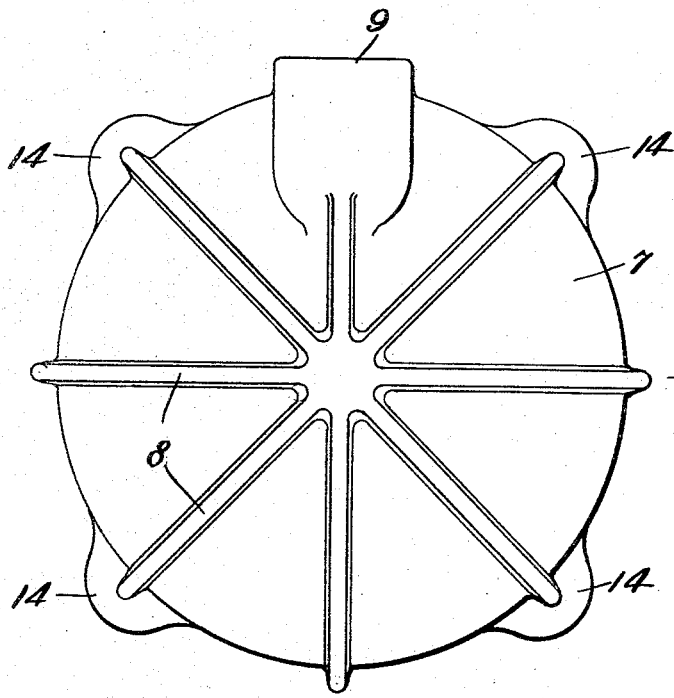
INVENTOR
GERHARDT C. R. KUIPER
BY
Louis W. Helmuth
ATTORNEY Patented Aug. 10, 1937

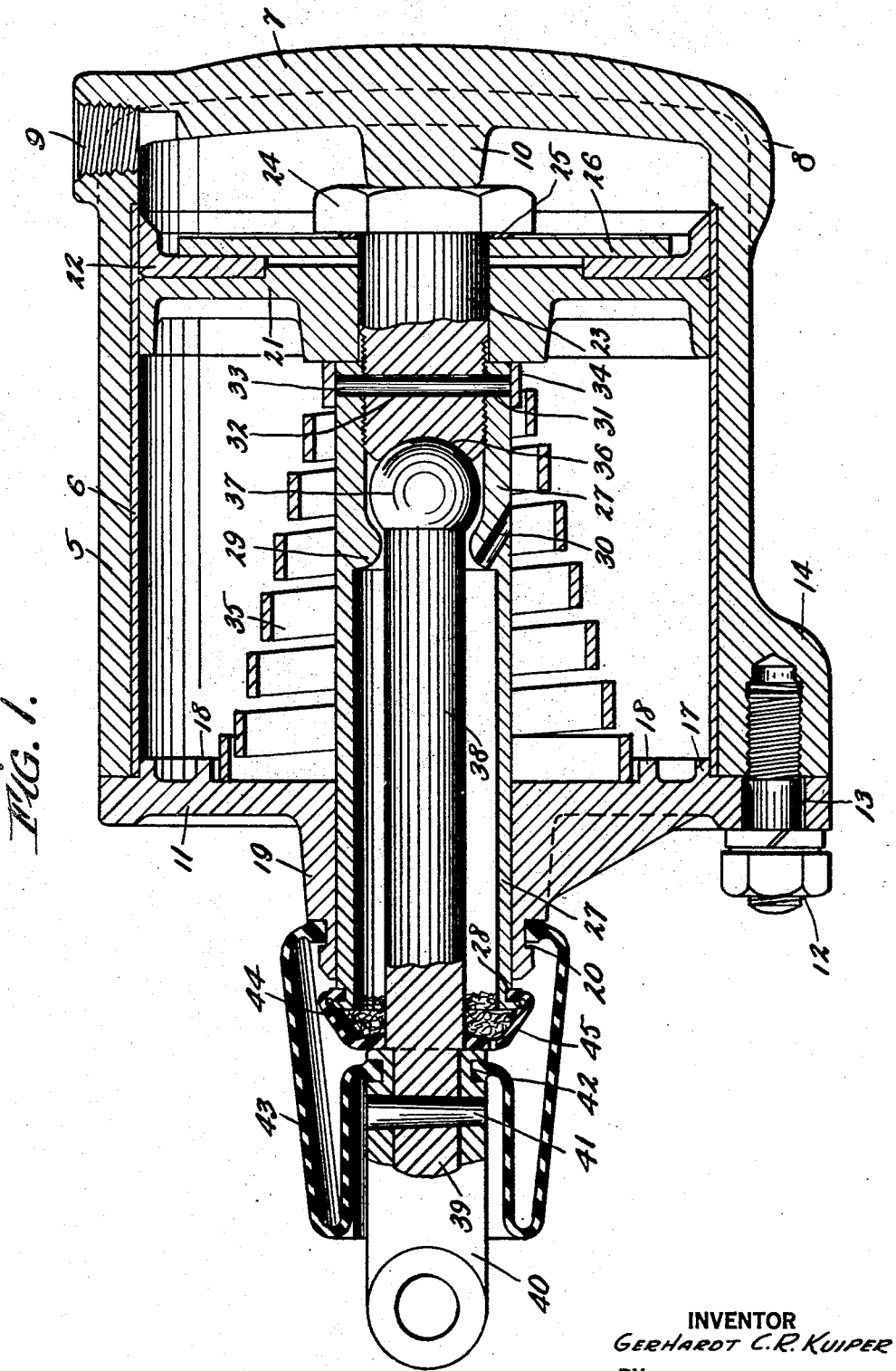

2,089,491

UNITED STATES PATENT OFFICE 2,089,491

POWER CYLINDER

Gerhard C. R. Kuiper, Cleveland, Ohio, assignor to The Midland Steel Products Company, Cleveland, Ohio, a corporation of Ohio Application October 28, 1933, Serial No. 695,655

6 Claims. (Cl. 60—62.6)

This invention relates to new and useful improvements in power units and more particularly to the piston type in which a fluid medium expends its force against one side of the piston for the power stroke and spring means are employed for returning it to normal position.

An important object of the invention is to provide a power unit having a piston rod universally connected with the piston head to adapt itself to the location of a force transmitting element without any tendencies to tilt the piston head during its movement.

Another important object of the invention is to provide efficient yet simple means for venting one side of the piston to the atmosphere.

A still further object of the invention is to provide means for connecting the rod to the piston head which also performs the functions of clamping the packing to the head and fastening a guide sleeve thereto.

Other objects and advantages of the invention will become apparent during the course of the following description.

In the accompanying drawings forming a part of the description and wherein like numerals are employed to designate like parts throughout the several views, Fig. 1 is a longitudinal section of the improved power unit, Fig. 2 is a side elevation of the same, and Fig. 3 is an end elevation of the unit.

Referring now more particularly to the drawings, the numeral 5 designates a cylinder of any suitable material but preferably aluminum, cast with a seamless steel liner 6 therein and an integral end head 7 having integral diametrical intersecting reinforcing ribs 8 extending over the edges of the head and down upon the body of the cylinder for a substantial distance. At the juncture of this head and the cylinder wall, a fluid medium opening 9 is tapped for the attachment of a line to direct fluid medium into this end of the cylinder. The fluid medium employed in conjunction with this construction is air under pressure but other mediums may be used. An integral boss 10 is cast on the end head 7 to extend axially into the cylinder as illustrated for limiting the release position of a piston.

The open end of the cylinder is closed by a removable head 11, clamped in position by means of screws 12 having their shanks extending through enlarged openings 13 in the end head and entering into enlarged integral bosses 14 on the cylinder. This head is also provided with a pair of diametrically arranged enlargements 15 terminating in outwardly extending threaded shanks 16 for attachment of the cylinder to a suitable support carried by the axle of the motor vehicle or other mechanism.

The inside of this head 11 is provided with an annular rib 17 for engagement with the inner wall of the steel liner for centering the head. It is also provided with a second annular rib 18 of smaller diameter forming a spring seat. The head 11 is provided with an outwardly extending boss forming a bearing which has an annular groove 20 adjacent its outer end.

A flanged piston head 21 is reciprocably mounted in the cylinder and is provided with a gasket or packing ring 22, substantially L-shaped in cross section so that its main body lies in a recess in the outer end of the piston head while its flange is slidably engaged with the steel liner. This piston head is provided with a central boss through which an axial opening extends for the insertion of a screw 23 having a head 24 clamping a gasket 25 against a gasket retaining plate 26 which holds the packing ring 22 firmly against the piston head. In normal release position of the piston, the head 24 of the screw may engage the boss 10 for limiting the stroke of the piston.

The inner inserted end of the screw 23 is screwed into the inner thickened end of a guide sleeve 27 which is thereby clamped to the piston head at its inner end, while its outer end is slidably mounted in the bearing 19 and projects a distance therebeyond where it is provided with an annular groove 28. Adjacent the inner threaded end of the sleeve, its bore is provided with an annular enlarged integral shoulder 29 having a rounded surface and an aperture 30 which communicates the interior of the sleeve with the interior of the cylinder. The threaded end of the sleeve is provided with a pair of diametrically arranged openings 31 which are adapted to register with a diametrically extending opening 32 in the screw 23 for the loose reception of a pin 33 for preventing relative rotation of the screw and sleeve. The ends of this pin 33 are overlapped by the end convolution 34 of a spirally coiled flat spring 35 having its larger end seating in the annular rib 18 while its smaller end bears against the boss of the piston head for normally urging the piston to brake release position.

The inner end of screw 23 is provided with a concave seat 36 for engagement with the ball shaped head 37 of a piston rod 38. This rod extends through the sleeve 27 and beyond its outer end to terminate in a reduced end 39. Mounted on this reduced end is a U-shaped yoke 40 secured thereto by a tapered pin 41. The inner end of this yoke 40 is provided with an annular groove 42 for the reception of one end of a rubber boot 43, the other end of which is seated in the groove 20 of bearing 19. This yoke 40 is adapted to be attached to a power transmitting element, not shown, such as the actuating element of a motor vehicle brake.

In order to filter air entering the cylinder, crinkled, matted hair 44 or other suitable filtering material is placed in the outer end of sleeve 27 and is retained therein by a rubber cup 45 having its base snugly engaging the piston rod 38 and bearing against a shoulder on yoke 40, while the lip of the cup is snapped into the groove 28 of the guide sleeve 27. The cup 45 is of course provided with an aperture for permitting atmospheric air to enter the sleeve 27 and pass through aperture 30 into the cylinder to preclude the piston setting up any vacuum tendencies.

From the foregoing it will be seen that the ball end 37 of piston rod is confined between the annular shoulder 29 and the concave seat of screw 23 and is thereby universally connected with the piston head so that the rod can be connected to a force transmitting element not located exactly on the axis of the piston head and without causing the piston head to tilt and increase friction, since the guide sleeve 27 accurately guides the piston along the axis of the cylinder.

It will be understood that various changes in the material, size, shape and arrangement of parts may be resorted to without departing from the scope of the appended claims.

I claim:

1. A power unit comprising a cylinder, a piston head therein, a piston packing for the head, a guide sleeve connected with the piston and extending through one end of the cylinder and having a shoulder adjacent said head, a piston rod, and means extending through the head and cooperating with the sleeve shoulder in forming a joint for connecting the piston rod to the piston head and said means having means for securing the sleeve thereto and said means also having means for clamping the packing to the head.

2. A power unit comprising a cylinder, a piston head therein, a piston packing, a guide sleeve connected to the piston head and extending through the end of the cylinder, said sleeve having a shoulder, a piston rod having a shoulder, and a screw extending through the head and having a head for clamping the packing to the piston head, and said screw being threadedly connected with the sleeve for holding the rod shoulder in cooperative relation to the sleeve shoulder for connecting the piston rod and sleeve to the piston head.

3. A power unit comprising a cylinder, a piston head, a piston packing, a guide sleeve connected with the piston and extending through the end of the cylinder and having a shoulder adjacent its inner end, a piston rod in said sleeve and having a head adjacent said shoulder, a headed screw having a concave end extending through the piston head and into the guide sleeve for engagement with the rod head for confining the same between said shoulder and the concave end of the screw, and the head of the screw serving to clamp the packing to the piston head.

4. A power unit comprising a cylinder, a piston head therein, a piston sleeve having a transverse opening, a member extending through the head and having a transverse opening adapted to register with the aforesaid opening, a pin extending through the registering openings, and a coil spring encircling the sleeve between the piston and cylinder head and having its end convolution overlapping said pin to preclude accidental displacement thereof.

5. A power unit comprising a cylinder, a piston head therein, a piston sleeve having a transverse opening, a member extending through the head and having a transverse opening adapted to register with the aforesaid opening, a pin extending through the registering openings, and a coiled spring encircling the sleeve for returning the piston to normal position after actuation and having a portion overlapping said pin to preclude accidental displacement thereof.

6. A power unit comprising a cylinder, a piston head therein, a piston packing for the head, a guide sleeve connected with the piston and extending through one end of the cylinder and having a shoulder, a piston rod having a head engaging said shoulder, and a screw extending through the piston head and having its end cooperating with the sleeve shoulder to form a joint for connecting the piston rod to said piston head, said screw threadedly engaging said sleeve and securing the sleeve to the piston head, and said screw having a head for clamping the packing to the piston head.

GERHARD C. R. KUIPER.